May 28, 1968
D. J. GRAY
3,385,568
BEATER STRUCTURE
Filed Nov. 16, 1966
2 Sheets-Sheet 1
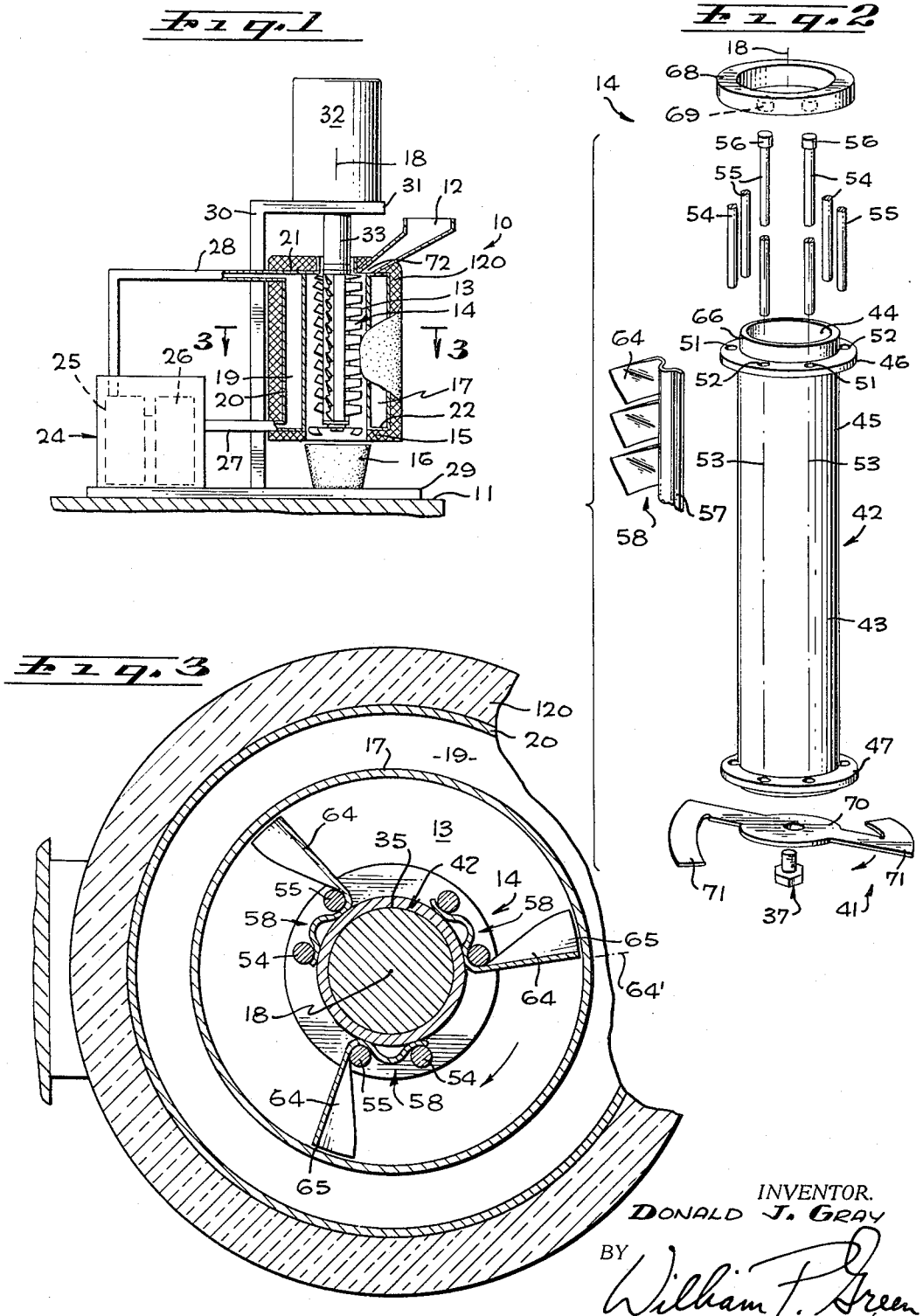
INVENTOR.
DONALD J. GRAY
BY William P. Green
ATTORNEY May 28, 1968 D. J. GRAY 3,385,568
BEATER STRUCTURE
Filed Nov. 16, 1966 2 Sheets-Sheet 2
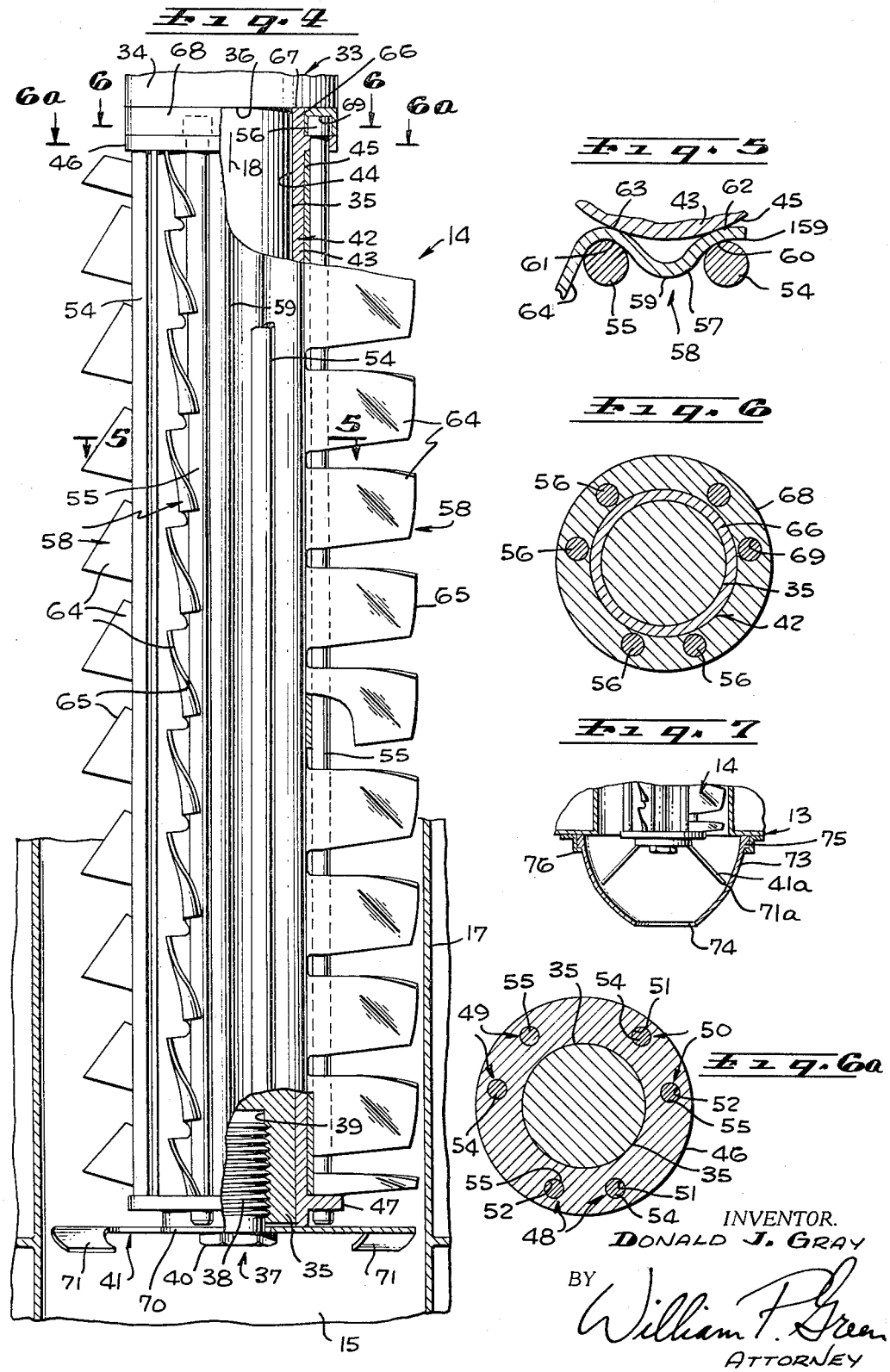
INVENTOR.
DONALD J. GRAY
BY William P. Green
ATTORNEY

United States Patent Office 3,385,568
Patented May 28, 1968

3,385,568
BEATER STRUCTURE
Donald J. Gray, 814 Market St.,
Inglewood, Calif. 90302
Filed Nov. 16, 1966, Ser. No. 594,939
13 Claims. (Cl. 259—24)

ABSTRACT OF THE DISCLOSURE

Apparatus including a rotor having an axially elongated body which is driven rotatably about an axis and which carries a beater unit having a mounting portion retained against the body by two axially elongated removable rods preferably received slidably within apertures in end flanges on the body, with the rods being received within spaced axial grooves in the mounting portion of the beater unit, and having a ridge on the mounting portion received between the rods, and with a series of beating fingers projecting outwardly from the mounting portion.

---

This invention relates to improved apparatus for preparing beaten food products and other substances, including both solids and liquids, but with certain aspects of the invention being especially concerned with the production of frozen foods similar to ice cream. The invention will be described primarily as applied to the manufacture of such frozen products.

The device embodying the invention includes a chamber into which a quantity of liquid is filled, and containing a rapidly turning beater acting to beat or agitate the liquid to a changed form, preferably while the liquid is being frozen, and in a manner preventing the development of large crystals or grains in the ultimate product.

A major object of the invention is to provide an improved beater or rotor structure for such a device, which rotor is capable of giving to the product an extremely smooth and uniform consistency, while desirably beating into the product a substantial amount of air, but with the beater being especially designed to facilitate very thorough and complete cleaning of the entire unit between uses. Many prior devices intended for this same purpose have had the disadvantage of being almost impossible to clean thoroughly, since their beater structures have been of a character inherently providing cavities and irregular shapes within which the food products can accumulate, and from which it is very difficult if not impossible to clean the food. Additionally, most of these prior beaters or rotors have been so difficult to disassemble as to definitely preclude any complete disassembling of the rotor on a daily or frequent and regular basis. As a result, the devices have not been capable of meeting strict sanitation and health standards, and therefore have not enjoyed use on as wide scale a basis as would be desired.

In a unit constructed in accordance with the present invention, the beater is so designed as to be very easily disassembled for thorough cleaning of its food contacting parts. More particularly, the beater includes a rotor body mounted to be driven rotatably about a predetermined axis, and carrying beating elements which are detachable from the body for cleaning. Desirably, these beater elements are secured to the body by retaining elements which extend generally axially of the main body, and which are so located as to retain predetermined mounting portions of the beater elements in confined relation. The retaining parts and the body in confined relation. The retaining elements may be elongated rods, which interfit with the body or with parts carried by the body, but are easily detachable from the body to enable removal of the beating elements. For best results, two such rods are employed in conjunction with each of the beating elements, with the monuting portion of the beating element being shaped to interfit with the rods in a manner retaining the beating element against lateral displacement. Each beating element may be formed of sheet metal or other sheet material, and have a series of fingers projecting outwardly therefrom into close proximity to the wall of the mixing chamber, to produce an effective beating action.

The above and other features and objects of the invention will be better understood from the following detailed description of the typical embodiments illustrated in the accompanying drawing, in which:

FIG. 1 is a vertical section through a freezing device constructed in accordance with the invention;

FIG. 2 is an exploded perspective view of the beater or rotor of FIG. 1;

FIG. 3 is an enlarged horizontal section taken on line 3—3 of FIG. 2;

FIG. 4 is an enlarged side view, partially broken away, of the beater or rotor of FIG. 1;

FIGS. 5, 6 and 6a are horizontal sections taken on lines 5—5, 6—6 and 6a—6a respectively of FIG. 4; and FIG. 7 shows the lower portion of a variational form of the invention.

Referring first to FIG. 1, I have illustrated at 10 a freezer unit constructed in accordance with the invention, and typically in the form of a table top device adapted to be supported on a table or bench surface represented at 11. The freezer 10 has an inlet 12 into which there is introduced a liquid to be frozen, such as an appropriate fruit juice, freezable mix, or any other desider ingredient or mixture of ingredients. The substance passes downwardly through a freezing chamber 13, within which it is beaten by a rotor or beater assembly 14, and is frozen to the ultimate form for final discharge downwardly through the bottom open end 15 of chamber 13 into a cup or other receptacle represented at 16.

Chamber 13 has a cylindrical side wall 17 centered about a vertical axis 18 of the apparatus, with an annular refrigerant passage 19 extending about wall 17. This refrigerant passage 19 may be defined by and between cylindrical vertical wall 17 of chamber 13 and a concentric vertically extending cylindrical outer wall 20, with top and bottom walls 21 and 22 closing the upper and lower ends of the passage. About wall 20, there may be provided an annular mass of heat insulating material 120, for preventing the transmission of heat from the atmosphere to the refrigerant within passage 19.

A refrigerating unit 24, inuluding the usual compressor 25 and condensor 26, delivers a pressurized refrigerant, such as Freon, in liquid form, into the lower end of refrigerant passage 19, through a line represented at 27. This refrigerant evaporates in conventional manner within passage 19, and ultimately leaves the upper end of that passage in gaseous form through a line 28 leading back to the inlet side of compressor 25, within which the gas is recompressed for condensation in condesor 26, and ultimate recirculation through line 27 to passage 19.

The refrigerating unit 24 is typically illustrated as mounted on a horizontal base 29 of the device, which may carry an upstanding support column or columns 30 to which chamber 13 and its associated parts are mounted. At the upper end of column 30, there may be provided a horizontal member 31, to which there is mounted an electric motor 32 having a downwardly projecting shaft 33 which is centered about and turns about the previously mentioned vertical axis 18. This motor 32 drives beater 14.

As seen best in FIG. 4, the driven shaft 33 of motor 32 has an upper externally cylindrical portion 34 of a relatively large diameter, and a lower similarly externally cylindrical portion 35 of a reduced diameter, with a transverse annular downwardly facing shoulder 36 being formed at the juncture of these two portions. The beater assembly 14 is carried by and about lower portion 35 of the shaft, and is removably secured thereto by a single bottom screw 37, having a shank 38 which is threadly connected upwardly into a threaded bore 39 in shaft portion 35. Screw 37 has an enlarged head 40 at its lower end, for engaging upwardly against a bottom feed element 41 in a relation securing the beater assembly 14 on the shaft.

The beater assembly itself includes a vertically extending elongated tubular carrier body 42, having an internally and externally cylindrical rigid side wall 43 preferably formed of stainless steel. The inner cylindrical surface 44 of side wall 43 is a diameter corresponding approximately to, or very slightly larger than, the external diameter of portion 35 of the shaft, to be a close fit thereon. The outer cylindrical surface 45 of tubular side wall 43, like surface 44, is centered about axis 18, and is continuous and uninterrupted between the locations of two upper and lower annular flanges 46 and 47 which are rigidly carried by wall 43. These flanges extend transversely with respect to axis 18, that is, horizontally, and are annular about that axis. These two flanges contain identical sets of apertures which are in vertical alignment with one another, and are arranged in the pattern illustrated in FIG. 6a. More particularly, each flange 46 and 47 contains three pairs 48, 49 and 50 of apertures for receiving interfitting retaining rods. As indicated in FIG. 6a, one of the two apertures of each pair is designated by the number 51, while the other aperture is designated by the number 52 to facilitate the later description of the device. These apertures are circular, as shown, and of identical sizes, and are centered about individual vertically extending axes 53 disposed parallel to and spaced about main axis 18.

Associated with each of the pairs of apertures 51 and 52, there are provided two vertically extending typically identical retaining rods 54 and 55, which are externally cylindrical and of a diameter corresponding to apertures 51 and 52, for sliding reception therein, except at the location of upper slightly enlarged externally cylindrical heads 56 formed on the rods to prevent their insertion downwardly into apertures 51 and 52 beyond the assembled positions of FIG. 4. Rods 54 and 55 extend parallel to outer surface 45 of wall 43 of body 42 (FIGS. 3 and 4) in closely spaced relation thereto, to confine and retain between the rods and surface 45 the mounting portions 57 of three beater elements 58.

To describe now the structure of one of the beater elements 58, each of these elements may be formed of a single vertically elongated strip of rigid sheet material, desirably stainless steel, stamped to the illustrated configuration. More particularly, as previously indicated, each beater element 58 forms a vertically extending mounting portion 57 which is received adjacent and against surface 44 of body wall 43, and which has the horizontal cross sectional configuration illustrated in FIG. 5. This cross section continues through the entire vertical extent of mounting portion 57, and specifically through the entire distance from upper flange 46 to lower flange 47 of the body. With reference to FIG. 5 the cross section is such as to define between the two coacting retaining rods 54 and 55 a vertically elongated radially outwardly bulging and projecting ridge 59, and to define at the locations of the rods two axially extending elongated grooves 60 and 61 within which the rods are received. As will be apparent, each of these grooves may be considered broadly as formed by and between two radially outwardly projecting portions of element 58, one of which is the mentioned central ridge 59. A second ridge forming groove 60 is designated 159, while a beating portion of element 58, consisting of a series of fingers 64, forms in effect the second side of groove 61.

The spacing between rods 54 and 55 and the surface 45 of body wall 43 corresponds substantially to the thickness of the sheet material of which beater element 58 is formed, so that the material is confined at 62 and 63 very closely between each of the rods and the opposed portion of surface 45, in a manner preventing shifting movement of element 58. The reception of rods 54 and 55 within grooves 60 and 61, and the reception of ridge 59 between rods 54 and 55, as well as the engagement with rod 55 of the outwardly projecting beating fingers 64, coacts with the discussed confinement of the material between the rods and surface 45 in a manner assuring against any substantial shifting movement of element 58 in any direction.

Beating fingers 64 are formed integrally with and project radially outwardly from mounting portion 57 of element 58, and at their radially inner extremities 63 may lie essentially in a common axially extending plane 64' (FIG. 3). As fingers 64 advance radially outwardly, they may be twisted so that their outer sharp edges 65 are disposed obliquely with respect to axis 18, to act as vanes inclined to progressively advance the food product downwardly within chamber 13 during the beating action. Outer edges 65 are received in very closely spaced proximate relation with respect to the inner surface of side wall 17 of the freezing chamber, but desirably are not in direct contact with that wall, the spacing typically being about ten thousandths of an inch. It is also noted that the fingers or vanes 64 of each beater unit are desirably staggered axially with respect to the fingers of the other two beater units (see FIG. 4), so that material which is displaced downwardly by one vane will find itself directly in the path of a next successive vane on the next beater unit.

Above upper flange 46 of beater body 42, this body may have an upwardly projecting annular portion 66 forming in effect an upper continuation of tubular side wall 43, and terminating in an upper horizontal annular surface 67 which is engageable against shoulder 36 of shaft 33. About portion 66 of body 42, there may be removably carried an annular ring 68, containing downwardly facing recesses 69 dimensioned to receive upper heads 56 of rods 54 and 55, to prevent upward movement of the rods out of their illustrated retaining position. Ring 68 may have upper and lower transverse horizontal surfaces engaging shoulder 36 and the upper surface of flange 46 respectively.

The lower feed element 41 at the bottom of the rotor assembly may have an annular portion 70 against which head 40 of bolt or screw 37 is engageable upwardly, and which in turn bears upwardly against the lower end of rotor body 42 upon tightening of screw 37. Thus, when the screw is tightened, the rotor body 42 is frictionally retained in fixed position relative to shaft 33, in a relation very effectively transmitting rotary motion from the shaft to body 42 and its carried parts, without slippage. Feed element 41 has vanes 71 projecting therefrom, which vanes are twisted in a direction to advance the frozen food product downwardly from the freezing chamber and out its open lower end 15 into cup 16 as the product reaches the lower end of the chamber.

To describe a cycle of use of the apparatus of FIGS. 1 through 6a, assume that the device is in its fully assembled condition, and that a cup or other receptacle 16 has been placed at the location illustrated in FIG. 1 to receive the frozen product. A user may then pour into inlet passageway 12 of FIG. 1 a measured quantity of fruit juice, a freezable mix, or the like, with motor 32 being energized to drive beater 14 at a relatively fast speed, say for example 1750 r.p.m. Inlet passageway 12 may have a fairly restricted portion as indicated at 72 so that the liquid to be frozen does not enter chamber 13 too rapidly. However, the entire freezing operation for one serving of the ultimate product may require only a few seconds, typically about 15 seconds. As the liquid reaches the interior of chamber 13, it is very rapidly frozen on the inner surface of wall 17 of the chamber, and at the same time is beaten rapidly and continuously removed from the chamber walls by the various beating fingers 64. As soon as a particular portion of the liquid has been frozen on the chamber wall, it is immediately scraped from the wall, and the pitch of the finger which performs this action is such as to deflect the removed frozen food product downwardly into the path of the next successive finger on the next successive one of the beater elements. This action occurs repeatedly until the entire product has been frozen, and has been advanced downwardly into cup 16, with the various beater fingers acting to beat air into the product, and prevent the development of crystals of substantial size. Consequently, the ultimate product is very smooth and palatable, and can have the appearance and taste of ice cream, a milk shake, or the like, even without the actual use of any milk, cream or other dairy products in the mix.

When it is desired to clean the apparatus, this may be done very readily by merely removing screw 37, so that the entire beater 14 including body 42, its carried parts, and ring 68, may be removed downwardly from the freezing chamber. Ring 68 may then be removed for washing, following which retaining rods 54 and 55 may be withdrawn axially upwardly from the apertures within flanges 46 and 47, so that the sheet metal beater elements 58 are freed for separation from body 42. All of these various disassembled parts may then be easily washed and reassembled onto shaft 33 for further use. Additionally, the interior of chamber 13 is readily accessible for thorough cleaning, and inlet 12 may also be cleaned easily, so that all of the food contacting portions in the apparatus are accessible for thorough washing on a very regular schedule.

FIG. 7 shows the apparatus of FIGS. 1 to 6a with an annular cone device 73 mounted in appropriate manner to the bottom of chamber 13, for directing the discharged product downwardly through a restricted opening 74 into an ice cream cone or the like. In FIG. 7, the bottom feed element 41a (corresponding to element 41 of FIGS. 2 and 4), may have its vanes or fingers 71a deflected downwardly at an inclination to facilitate advancement of the food product into the restricted opening 74. Like the other parts which contact the food materials, cone device 73 may be designed for easy detachment from chamber 13, as by provision of an upper bead or ring 75 on the periphery of cone element 73 adapted to be snapped into an appropriate annular retaining groove formed in a retaining bracket 76 at the bottom of the freezing chamber.

I claim:

1. Apparatus for preparing a beaten product comprising a chamber into which the ingredients of said product are introduced, a rotor structure for beating said product in said chamber, and a motor for driving said rotor structure, said rotor structure including a body structure adapted to be driven rotatably about an axis by said motor, a beater unit detachably carried and rotatably driven by said body structure for engaging and beating said product and having a mounting portion received adjacent the body structure, and retaining means detachably connectible to said body structure and extending generally axially relative thereto at a location to confine said mounting portion of the beater unit between said body structure and said retaining means and to releasably secure the beater unit to the body structure, primarily by such confinement of the mounting portion between said body structure and retaining means, said mounting portion forming a ridge extending generally axially alongside said retaining means in an interfitting relation preventing relative lateral movement of said beater unit.

2. Apparatus for preparing a beaten product comprising a chamber into which the ingredients of said product are introduced, a rotor structure for beating said product in said chamber, and a motor for driving said rotor structure, said rotor structure including a body structure adapted to be driven rotatably about an axis by said motor, a beater unit detachably carried and rotatably driven by said body structure for engaging and beating said product and having a mounting portion received adjacent the body structure, and retaining means detachably connectible to said body structure and extending generally axially relative thereto at a location to confine said mounting portion of the beater unit between said body structure and said retaining means and to releasably secure the beater unit to the body structure, primarily by such confinement of the mounting portion between said body structure and retaining means, said retaining means including two generally parallel axially elongated rods extending along the outer surface of said body structure in spaced relation thereto and confining said mounting portion between said rods and said body structure, said mounting portion forming an outwardly projecting ridge received circularly between said two rods in an interfitting relation retaining said beater unit against lateral movement.

3. Apparatus as recited in claim 2, in which said beater unit has a beating portion forming an axial series of outwardly projecting fingers, one of said rods being received between said ridge and said beating portion.

4. Apparatus for preparing a beaten product comprising a chamber into which the ingredients of said product are introduced, a rotor structure for beating said product in said chamber, and a motor for driving said rotor structure, said rotor structure including a body structure adapted to be driven rotatably about an axis by said motor, a beater unit detachably carried and rotatably driven by said body structure for engaging and beating said product and having a mounting portion received adjacent the body structure, and retaining means detachably connectible to said body structure and extending generally axially relative thereto at a location to confine said mounting portion of the beater unit between said body structure and said retaining means and to releasably secure the beater unit to the body structure, primarily by such confinement of the mounting portion between said body structure and retaining means, said mounting portion of the beater unit extending generally axially along an outer surface of said body structure in contact therewith and being shaped to define an axially elongated outwardly projecting ridge, said retaining means including two axially elongated rods removably secured to said body structure with said mounting portion confined between said rods and said body structure, said body structure having two flanges at opposite ends of the beater unit containing apertures for slidably and removably receiving said rods to removably retain them in interfitting relation with said mounting portion, said ridge being received laterally between said two rods.

5. Apparatus as recited in claim 4, in which said beater unit has an outwardly projecting portion forming a series of axially successive beating fingers extending into close proximity to said wall of the chamber, one of said rods being received laterally between said ridge and said outwardly projecting portion of the beater unit which forms said fingers.

6. Apparatus as recited in claim 5, including a rotary shaft driven by said motor, said body structure being tubular and disposed about and driven by said shaft, there being a plurality of said beater units extending axially along the outer surface of said tubular body structure at different circularly spaced locations, there being a pair of said parallel axially extending retaining rods interfitting with and retaining each of said beater units and slidably receivable within different pairs of said apertures in said flanges, each of said mounting portions forming one of said ridges, one rod of each pair being confined between said ridge of the associated beater unit and said finger forming portion thereof, and the other rod of each pair being received within an axial groove formed in the mounting portion of the associated beater unit.

7. Apparatus for preparing a beaten product comprising a chamber into which the ingredients of said product are introduced, a rotor structure for beating said product in said chamber, and a motor for driving said rotor structure, said rotor structure including a body structure adapted to be driven rotatably about an axis by said motor, a beater unit detachably carried and rotatably driven by said body structure for engaging and beating said product and having a mounting portion received adjacent the body structure, and retaining means detachably connectible to said body structure and extending generally axially relative thereto at a location to confine said mounting portion of the beater unit between said body structure and said retaining means and to releasably secure the beater unit to the body structure, primarily by such confinement of the mounting portion between said body structure and retaining means, said retaining means including two axially elongated retaining elements engaging and retaining said mounting portion of the beater unit at two different circularly spaced locations.

8. Apparatus for preparing a beaten product comprising a chamber into which the ingredients of said product are introduced, a rotor structure for beating said product in said chamber, and a motor for driving said rotor structure, said rotor structure including a body structure adapted to be driven rotatably about an axis by said motor, a beater unit detachably carried and rotatably driven by said body structure for engaging and beating said product and having a mounting portion received adjacent the body structure, and retaining means detachably connectible to said body structure and extending generally axially relative thereto at a location to confine said mounting portion of the beater unit between said body structure and said retaining means and to releasably secure the beater unit to the body structure, primarily by such confinement of the mounting portion between said body structure and retaining means, said mounting portion of the beater unit containing a groove at least partially receiving said retaining means in an interfitting relation preventing relative lateral movement of said beater unit.

9. Apparatus for preparing a beaten product comprising a chamber into which the ingredients of said product are introduced, a rotor structure for beating said product in said chamber, and a motor for driving said rotor structure, said rotor structure including a body structure adapted to be driven rotatably about an axis by said motor, a beater unit detachably carried and rotatably driven by said body structure for engaging and beating said product and having a mounting portion received adjacent the body structure, and retaining means detachably connectible to said body structure and extending generally axially relative thereto at a location to confine said mounting portion of the beater unit between said body structure and said retaining means and to releasably secure the beater unit to the body structure, primarily by such confinement of the mounting portion between said body structure and retaining means, said retaining means including two axially elongated retaining elements engaging and retaining said mounting portion of the beater unit at two different circularly spaced locations, said mounting portion of the beater unit containing two axially elongated grooves receiving said retaining elements respectively in an interfitting relation preventing relative lateral movement of said beater unit.

10. Apparatus for preparing a beaten product comprising a chamber into which the ingredients of said product are introduced, a rotor structure for beating said product in said chamber, and a motor for driving said rotor structure, said rotor structure including a body structure adapted to be driven rotatably about an axis by said motor and having upper and lower enlargements projecting radially outwardly therefrom, a beater unit detachably carried and rotatably driven by said body structure for engaging and beating said product and having a mounting portion received adjacent and extending axially along the body structure between said upper and lower enlargements, said beater unit having a series of beating fingers carried by and projecting from said mounting portion at axially spaced locations, and two retaining rods removably received within apertures in said upper and lower enlargements and extending generally axially between said enlargements and past said mounting portion of the beater unit at a location to confine said mounting portion between said body structure and said rods and to thereby releasably secure the beater unit to the body structure.

11. Apparatus as recited in claim 10, in which said body structure is elongated essentially along said axis and is disposed thereabout and has an outer cylindrical surface, said retaining rods extending essentially parallel to said outer surface in spaced relation thereto to retain said mounting portion of the beater unit thereagainst.

12. Apparatus as recited in claim 10, in which said body structure is essentially tubular, there being a shaft driven by said motor and extending axially within and carrying said body structure for rotation therewith.

13. Apparatus as recited in claim 10, including means for refrigerating said chamber.

References Cited

UNITED STATES PATENTS

| | | | |
|---|---|---|---|
| 2,622,411 | 12/1952 | Ogden | 259—8 X |
| 2,646,974 | 7/1953 | Read | 259—8 |
| 2,671,646 | 3/1954 | Lindsey | 259—4 |

ROBERT W. JENKINS, *Primary Examiner.*